United States Patent [19]
Houde et al.

[11] Patent Number: 6,081,705
[45] Date of Patent: Jun. 27, 2000

[54] CELLULAR TELEPHONE NETWORK SUPPORT OF INTERNATIONAL MOBILE STATION IDENTITY (IMSI)

[75] Inventors: Michel Houde, St Laurent; Alain Boudreau, Le Gardeur, both of Canada

[73] Assignee: Telefonaktiebolaget L/M Ericsson (publ), Stockholm, Sweden

[21] Appl. No.: 08/796,808

[22] Filed: Feb. 6, 1997

[51] Int. Cl.[7] ................................. H04B 1/06; H04J 3/16
[52] U.S. Cl. ......................... 455/411; 455/451; 455/424; 370/466; 370/467
[58] Field of Search ................................... 455/410, 411, 455/424, 551, 422, 435, 436, 432, 461, 462; 370/466, 467

[56] References Cited

U.S. PATENT DOCUMENTS

| | | | |
|---|---|---|---|
| 5,091,942 | 2/1992 | Dent | 380/46 |
| 5,537,457 | 7/1996 | Lantto et al. | 379/58 |
| 5,557,654 | 9/1996 | Maenpaa | 379/58 |
| 5,625,671 | 4/1997 | Salin | 379/58 |
| 5,699,408 | 12/1997 | Krolopp et al. | 375/59 |
| 5,749,053 | 5/1998 | Kusaki | 455/524 |
| 5,754,952 | 5/1998 | Hodges et al. | 455/411 |
| 5,765,105 | 6/1998 | Kuriki | 455/410 |

FOREIGN PATENT DOCUMENTS

| | | |
|---|---|---|
| 0 652 680 | 11/1994 | European Pat. Off. . |
| WO 93/17529 | 9/1993 | WIPO . |

OTHER PUBLICATIONS

PCT International Search Report, Oct. 21, 1998, PCT/SE 98/00057.

Rueppel, et al., "Feind hört mit", Technische Rundschau 84 (1992) Jan. 10, pp. 46–49.

Sakurai, et al., "Service Description and Usage of Identities/Numbers for FPLMTS", Nov. 6, 1995 IEEE International Conference on Universal Personal Communications, pp. 168–172.

M. Mouly; "Security Management", GSM System for Mobile Communications 1993, pp. 477–493 and 568–576.

*Structure of the Land Mobile Global Title for the Signalling Connection Control Part (SCCP) (Recommendation E.214)* International Telecommunication Union, Operation, Numbering, Routing and Mobile Service (Extracted from the Blue Book).

*Identification Plan for the Land Mobile Stations (Recommendation E.212)* International Telecommunicatio NA Union, Operation, Numbering, Routing and Mobile Service (Extracted from the Blue Book).

*International Roaming Between PCS 1900 and GSM* Ericsson, Inc., CMS 40 Technical Report Mar. 18, 1996.

*Contribution to GSM North American Interest Group (NAIG) on International Roaming* by Daniel Collins, DCR Communications Presented Mar. 28, 1996.

*Numbering Plan for the ISDN ERA*, Telephone Network and ISDN Operation, Numbering, Routing and Mobile Service The International Telegraph and Telephone Consultative Committee Recommendation E.164 Geneva, 1991.

*IMSI's Impact on Call Delivery* D. Cameron, D. Sugirtharaj, F. Jones, S. McAllister, K. Raith, A. Boudreau and M. Houde, Ericsson, Inc. TIA Subcommittee TR45.2 Intersystem Operations Santa Barbara, California, Mar. 11–15, 1996.

(List continued on next page.)

*Primary Examiner*—Wellington Chin
*Assistant Examiner*—Sheila Smith

[57] ABSTRACT

TIA IS-136 specifies the assignment to mobile stations of a unique international mobile station identification (IMSI) in addition to a mobile identification number (MIN). The IMSI number is communicated from the mobile station to the network, and is processed by the network to provide for non-ambiguous subscriber identification. Accordingly, the IMSI number is transmitted by the mobile station during registration, and processed during authentication to insure accurate and unique subscriber identification. Once registered with an IMSI instead of a MIN, the network utilizes the IMSI during subsequent call handling to insure, for example, proper call delivery and handoff.

16 Claims, 15 Drawing Sheets

OTHER PUBLICATIONS

*IMSI and Handoff*—Draft Michel Houde, Ericsson, Inc. TIA Subcommittee TR45.2 Intersystem Operations Santa Barbara, California, Mar. 11–15, 1996.

*IMSI's Impact on Authentication Request and Registration*—Draft D. Cameron, D. Sugirtharaj, F. Jones, S. McAllister, K. Raith, A. Boudreau, and M. Houde, Ericsson, Inc. TIA Subcommittee TR45.2 Intersystem Operations Santa Barbara, California, Mar. 11–15, 1996.

*IMSI and Handoff* Michel Houde, Ericsson, Inc. TIA Subcommittee TR45.2 Intersystem Operations New Orleans, Louisiana, Feb. 12–16, 1996.

*IMSI's Impact on Authentication Request and Registration* D. Cameron, D. Sugirtharaj, F. Jones, S. McAllister, K. Raith, A. Boudreau, and M. Houde, Ericsson, Inc. TIA Subcommittee TR45.2 Intersystem Operations New Orleans, Louisiana, Feb. 12–16, 1996.

*IMSI's Impact on Call Delivery* D. Sugi, D. Cameron, F. Jones, S. McAllister, K. Raith and M. Houde, Ericsson, Inc. TIA Subcommittee TR45.2 Intersystem Opeations New Orleans, Louisiana, Feb. 12–16, 1996.

6,081,705

CELLULAR TELEPHONE NETWORK SUPPORT OF INTERNATIONAL MOBILE STATION IDENTITY (IMSI)

BACKGROUND OF THE INVENTION

1. Technical Field of the Invention

The present invention relates to cellular telephone networks and, in particular, to the network passing and handling of transmitted international mobile station identity (IMSI) numbers during authentication and registration, call delivery and call hand-off.

2. Description of Related Art

Perhaps the most important selling feature of cellular telephone service is the advantage of mobility. Those persons who subscribe to a cellular telephone service do so in order to be able to make and receive telephone calls without being tied to a fixed location. Such subscribers further often carry their cellular telephones with them on trips, and make use of their subscriptions while roaming not only within their home country, but also within foreign countries. It is when persons roam to different countries whose service is regulated by different standards and numbering plans, and provided using different protocols that conflicts and concerns with service provision often arise.

One instance of potential conflict arises when two or more cellular telephones are assigned use of the same mobile identification number (MIN), where the numbers are attributed to two different numbering plans, and where one of those telephones roams into the service jurisdiction of the other telephone. For example, in instances where a detection from the mobile station electronic serial number (ESN) of a fraudulent cellular telephone is not made, and if that roaming cellular telephone should make a registration within the visited service jurisdiction, the other (home) cellular telephone may be wrongly marked by the system as being located at the roaming telephone location. In such a case, an incoming call to the home telephone may instead be directed to the roaming cellular telephone. Furthermore, the subscriber profile for the home cellular telephone may be downloaded from the home location register to the switching center currently serving the roaming cellular telephone. The roamer accordingly has access to an incorrect profile. Also, charges for calls made or received by the roaming cellular telephone may be incorrectly billed to the account of the home cellular telephone. Other problems arising in such a situation are known to those skilled in the art.

Another instance of potential conflict arises when a cellular telephone roams into a service jurisdiction which does not recognize the numbering plan to which that mobile station's mobile identification number is associated. For example, in attempting to provide service to the cellular telephone, the cellular system may not be able to identify the home location register to which the telephone belongs. Accordingly, service to the cellular telephone may be denied, or somewhat limited (and potentially incorrect) service will be provided using a default subscriber profile.

Each of the foregoing instances of potential conflict arise because of problems encountered in attempting to uniquely identifying the cellular telephone requesting service. It is therefore of some concern that cellular telephones be uniquely identified on a world-wide basis, rather than just within one or more individual cellular service jurisdictions or numbering plans.

Some solutions have been proposed to this problem. For example, from the perspective of the air interface, the TIA/EIA IS-136A Specification provides for the assignment of a unique international mobile station identity (IMSI) number to each cellular telephone. With implementation of this identification scheme, every cellular telephone will have its own unique identification number. Responsive to the system information received in the overhead message train, the IS-136A mobile station uses either the mobile identification number or the international mobile station identity number to identify itself over the air interface. While IS-136 addresses the use and transmission of the international mobile station identity number over the air interface by a cellular telephone, there is no specification for how this number is to be processed by the cellular network in view of the existing use and registration of mobile identification numbers (MINs) for cellular telephones. Accordingly, there is a need then for a specification of the network operations (and in particular the operations of registration, authentication, call delivery and handoff) supporting the use of the international mobile station identity number as transmitted over the air interface.

SUMMARY OF THE INVENTION

TIA IS-136 specifies the assignment to mobile stations of a unique international mobile station identification (IMSI) in addition to a mobile identification number (MIN). To support non-ambiguous subscriber profile retrieval, registration, authentication, call delivery, hand off and accurate service billing in those instances where a mobile station roams, the present invention calls for the communication and processing of the air interface transmitted mobile station IMSI number during mobile station registration, authentication, call delivery and hand off. Thereafter, the IMSI number of the mobile station is communicated within and processed by the network to insure accurate and unique subscriber identification in connection with network authentication, call delivery and hand off operations.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
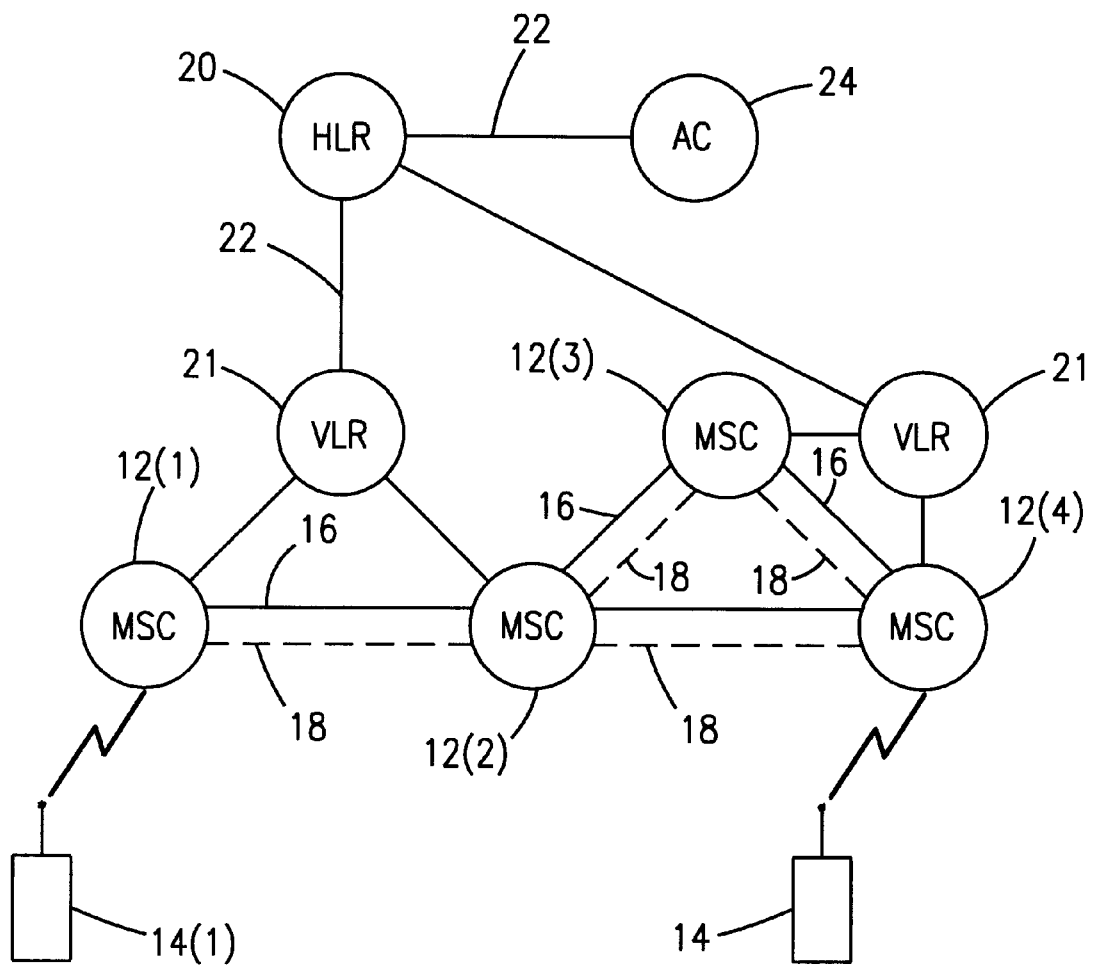
FIG. 1 is a schematic diagram of a cellular telephone network.

Reference is now made to FIG. 1 wherein there is shown a simplified schematic diagram of a cellular telephone network 10 including a plurality of interconnected switching nodes 12 also referred to as mobile switching centers (MSC). Although only four switching nodes 12 are shown, it will be understood that the network 10 likely includes many more interconnected nodes. The switching nodes 12 may comprise any one of a number of known telecommunications switching devices, including those commonly used and known in the art which support either digital or analog cellular telephone service to a plurality of subscriber cellular telephones 14. The switching nodes 12 are interconnected for communication via both signaling links 16 (illustrated with solid lines) and voice trunks 18 (illustrated with broken lines). The voice trunks 18 provide voice and data communications paths used for carrying subscriber communications between the nodes 12. The signaling links 16 carry command signals between the nodes 12 used for setting up and tearing down voice and data communications links over the voice trunks 18, and for controlling the provision of special subscriber calling service features to the subscriber cellular telephones 14.

Each switching node 12 is connected to a visitor location register data base 21. The switching nodes 12 are connected to a home location register (HLR) data base 20 (or perhaps to plural data bases if necessary) through VLR 21 by means of signaling links 22. Although illustrated as a separate node, it will be understood that the visitor location register 21 may comprise a part of the switching node 12. The data base(s) for the home location register 20 and visitor location register 21 store information concerning the subscriber cellular telephones 14 comprising location information and service information. In particular, the home location register data base 20 stores the subscriber profile for each cellular telephone 14, with this subscriber profile downloaded to the visitor location register 21 of the switching node 12 where the subscriber is currently located.

The home location registers 20 are further connected to an authentication center (AC) 24 by means of signaling links 22. The authentication center 24 authenticates subscriber cellular telephones using an authentication algorithm in order to verify subscriber right to use the cellular network 10. Although illustrated as a separate node in the network 10, it will be understood that the authentication center 24 may alternatively be located in the home location register 20.

Certain assumptions are made with respect to the configuration of the network 10 concerning the various available identifications for cellular telephones 14. Each cellular telephone 14 is identified by either (a) a mobile identification number (MIN) only, (b) an international mobile station identity (IMSI) number only, or (c) both a MIN and an IMSI number. It will, of course, be understood that other mechanisms for identifying a telephone 14 (such as a temporary mobile station identification—TMSI) exist. For the home location register data base 20, at the time of cellular telephone subscription, if that cellular telephone 14 has only a mobile identification number, the system administrator inputs the mobile identification number, and the home location register, visitor location register, switching node and authentication center use the mobile identification number as the index to the subscription, and as an input for execution of the authentication algorithm. If the cellular telephone 14 has both a mobile identification number and an international mobile station identity (IMSI), the system administrator inputs both the mobile identification number and the international mobile station identity number, and the home location register, visitor location register, switching node and authentication center use either the mobile identification number or the international mobile station identity number as the index to the subscription, and as an input for execution of the authentication algorithm. If the cellular telephone 14 has only an international mobile station identity, the system administrator inputs the international mobile station identity number, and the home location register, visitor location register, switching node and authentication center use the international mobile station identity number as the index to the subscription, and as an input for execution of the authentication algorithm.

Figure 2:
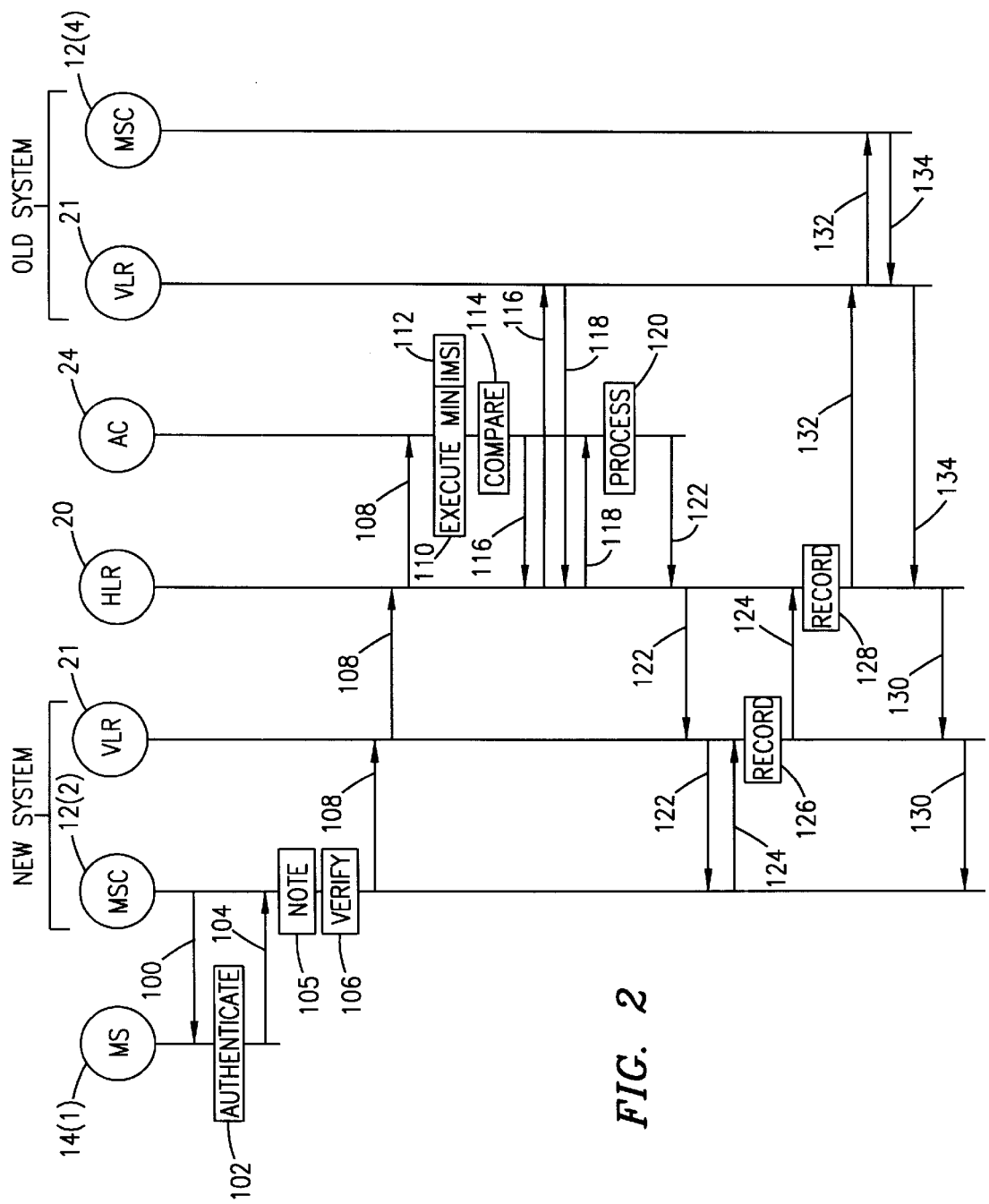
FIG. 2 is a signal flow and node operation diagram for the cellular telephone network of FIG. 1 illustrating the flow of signals in connection with a present invention handling of the registration and authentication processes for a cellular telephone having an international mobile station identity (IMSI) number.

Reference is now made in combination to FIGS. 1 and 2. FIG. 2 is a signal flow and node operation diagram for the cellular telephone network of FIG. 1 illustrating the flow of signals in connection with a present invention handling of the registration and authentication process for a cellular telephone 14 having at least an international mobile station identity (IMSI) number (and perhaps also having a mobile identification number (MIN)). In this registration and authentication process example it is assumed that the subscriber cellular telephone 14(1) of interest is currently being served by switching node 12(2) but was previously served by switching node 12(1).

The base stations (not shown) for the currently serving switching node 12(2) broadcast an overhead message train (OMT) 100 to proximately located cellular telephones 14 including the telephone 14(1) of interest. In the overhead message train 100, the network 10 specifies information concerning system identification, country code, authentication requirements (like the random number RAND), and whether international mobile station identity numbers for cellular telephones 14 are supported by the network. Because the international mobile station identity number is supported, the mobile station determines that in order to be unambiguously recognized it authenticates itself and registers using the international mobile station identity number. Responsive to the overhead communicated information, the cellular telephone 14(1) executes the authentication algorithm (step 102) using appropriate parameters such as its electronic serial number (ESN), and the broadcast random number value. It uses, as well, a mobile identification number (MIN) synthesized from (or equivalent to) the international mobile station identity (IMSI), to produce an authentication result (AUTHR). The cellular telephone 14(1) then registers 104 with the serving switching node 12(2) supplying parameters such as its international mobile station identity, electronic serial number, authentication result, call history count (COUNT) and RANDC (derived from the network supplied random number that was used to compute the authentication result).

Responsive to the signal 104, the serving switching node 12(2) notes that the cellular telephone 14(1) used its international mobile station identity number (step 105), verifies the RANDC (step 106), and then sends an authorization request message 108 (including the international mobile station identity number) to the visitor location register for the serving switching node. The authentication request message 108 is then forwarded to the authentication center 24 via the home location register 20 to which the cellular telephone 14(1) is assigned. The visitor location register may authenticate using a mobile identification number derived from the international mobile station identity number, or relay the authentication message to the home location register. The home location register 20 may choose to relay the international mobile station identity number to the authentication center 24, or may instead associate a mobile identification number with the international mobile station identity number and send the mobile identification number to the authentication center.

If the authentication center 24 receives a mobile identification number in the authentication request 108, it executes 110 the authentication algorithm with the mobile identification number as an input. If the authentication center 24 instead receives an international mobile station identity number in the authentication request 108, it associates a mobile identification number with the received international mobile station identity number and executes 112 the authentication algorithm with the associated mobile identification number as an input. Execution of the authentication algorithm produces an authentication result which is compared 114 by the authentication center 24 with the authentication result transmitted along with the authentication request 108.

The count received in the authentication request 108 is then verified by the authentication center 24. A count request message 116 populated with either the mobile identification number or the international mobile station identity is sent to the visitor location register 21 for the previously serving switching node 12(1) via the home location register 20. The retrieved count contained in a count request response message 118 is then processed 120 for verification.

An authorization request response 122 is then sent from the authentication center 24 back to the currently serving switching node 12(2) via the home location register 20 and switch associated visitor location center 21. This response 122 may authorize cellular telephone 14(1) access to the network 10 (along with other updating and/or directive data) if the authentication results and counts are verified, or deny access to the network if they are not verified. This response 122 includes the mobile identification number, which is then provided to both the switching node and the visitor location register. It should be noted, however, that the mobile identification number need not be provided if it can be derived from the international mobile station identity number.

Following successful authentication of the cellular telephone 14(1), the serving switching node 12(2) sends a registration notification message 124 to its associated visitor location register 21. This message includes the international mobile station identity number used by the mobile station 14(1) in its registration message 104. The visitor location register then records (step 126) that the cellular telephone 14(1) made an air interface access using its international mobile station identity number. The registration notification message 124 is then forwarded to the home location register 20 to which the cellular telephone 14(1) is assigned. The home location register 20 then records (step 128) that the cellular telephone 14(1) made an air interface access using its international mobile station identity number and that the cellular telephone has a new location. A registration notification response 130 is then sent back to the serving switching node 12(2) via its associated visitor location register 21. This response 130 includes the subscriber profile information associated in the home location register 20 with the registering subscriber mobile station. The response 130 further includes the mobile identification number when the mobile has both.

If the cellular telephone 14(1) was previously served by another switching node 12(1) and thus registered in another visitor location register 21, the home location register 20 sends a registration cancellation message 132 to that other visitor location register. This message includes the international mobile station identity number or mobile identification number used by the mobile station 14(1) in its registration message 104. The message 132 is forwarded from the other visitor location register 21 to its associated switching node 12(1). A registration cancellation response 134 is then sent by the previously serving switching node 12(1) via its associated visitor location register 21 to the home location register 20.

The foregoing description of the registration and authentication processes for a mobile station differs from the prior art processes in that the system supports mobile station registration and authentication as identified with either a mobile identification number or an international mobile station identity number. By registering and authenticating in this fashion, unambiguous identification of the mobile station may made by the system.

Figure 3:
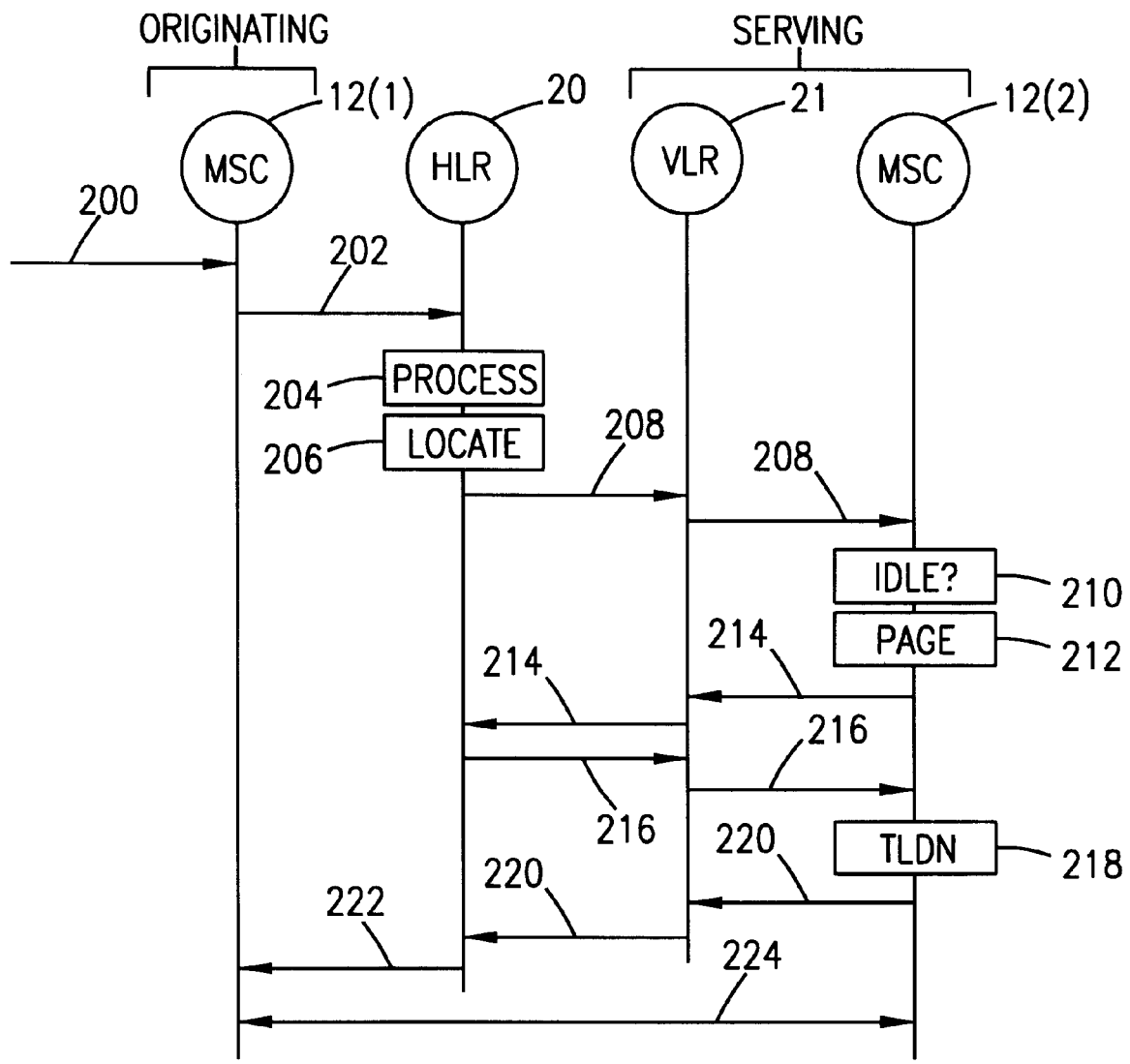
FIG. 3 is a signal flow and node operation diagram for the cellular telephone network of FIG. 1 illustrating the flow of signals in connection with a present invention handling of the call delivery process for a cellular telephone having an international mobile station identity (IMSI) number.

Reference is now made in combination to FIGS. 1 and 3. FIG. 3 is a signal flow and node operation diagram for the cellular telephone network of FIG. 1 illustrating the flow of signals in connection with a present invention handling of the call delivery process for a cellular telephone having at least an international mobile station identity (IMSI) number (and perhaps also having a mobile identification number (MIN)). In this call delivery process example it is assumed that the subscriber cellular telephone 14(1) of interest is currently being served by switching node 12(2) that the originating call is received at switching node 12(1).

A call 200 dialed to the directory number of mobile station 14(1) originates from another cellular subscriber or the (public switched telephone network) PSTN and is received at the originating switching node 12(1). In this instance, the dialed directory number may differ from the mobile station's mobile identification number or international mobile station identity number. The originating switching node 12(1) then interrogates the home location register data base 20 with a location request 202 including the dialed directory number. The dialed directory number included within the location request 202 is then processed by the home location register data base 20 to confirm that the number is assigned to a legitimate subscriber (step 204), and to determine in step 206 the location (i.e., serving switching node 12(2)) within the cellular network 10 of the called mobile station subscriber 14(1). Responsive thereto, the home location register data base 20 signals the visitor location register 21 of the serving switching node 12(2) for the called mobile station subscriber 14(1) with a routing request 208. Since the called mobile station 14(1) used its IMSI for its last registration (see, FIG. 2), the routing request 208 is populated with the IMSI associated with the dialed mobile station. The routing request 208 is then forwarded to the serving switching node 12(2). The serving switching node 12(2) then checks in step 210 to determine whether the called mobile station 14(1) is already engaged in a call. In this example, we assume that the mobile station 14(1) is currently idle. The serving switching node 12(2) then pages the called mobile station 14(1) in step 212.

If the service profile for the called mobile station subscriber 14(1) has not previously been downloaded from the visitor location register 21 to the serving switching node 12(2), a qualification request message 214 including the IMSI is sent to the visitor location register. If the mobile station 14(1) having the designated IMSI is unknown to the visitor location register 21, the request message 214 is forwarded on to the home location register 20. Appropriate response messages 216 including the subscriber profile are sent from either the home location register 20 or visitor location register 21 to the serving switching node 12(2). The response messages 216 include the mobile identification number (if available).

The serving switching node 12(2) then assigns in step 218 a temporary local (roaming) directory number (and associated parameters) for the called mobile station subscriber 14(1). The number is then sent in a routing request return result message 220 to the home location register data base 20 via the visitor location register 21. Responsive thereto, the home location register 20 sends a location request return result message 222 including necessary routing information to the originating switching node 12(1). The response message 222 includes the mobile identification number (if available). The incoming call is then delivered (through connected) 224 over the voice trunk 18 to the serving switching node 12(2) for attempted completion to the called mobile station subscriber 14(1).

The foregoing description of the call delivery process differs from the prior art process in that the system supports mobile station identification using either a mobile identification number or an international mobile station identity number. Accordingly, unambiguous identification of the mobile station may made by the system.

Reference is now made in combination to FIGS. 1 and 4A–4J. FIGS. 4A–4J are signal flow and node operation diagrams for the cellular telephone network of FIG. 1 illustrating the flow of signals in connection with a present invention handling of call handoff processes for a cellular telephone having at least an international mobile station identity (IMSI) number (and perhaps also a mobile identification number (MIN)). Certain assumptions are made with respect to the configuration of the network 10 concerning handoff. For a cellular telephone 14 having both a mobile identification number and an international mobile station identity number, the mobile station registers (see, FIG. 2) using its IMSI, and is allowed to handoff to a non-IMSI supporting system. If the cellular telephone has only an international mobile station identity number, the mobile station registers (see, FIG. 2) using its IMSI, and is not allowed to handoff to a non-IMSI supporting system.

Figure 4A:
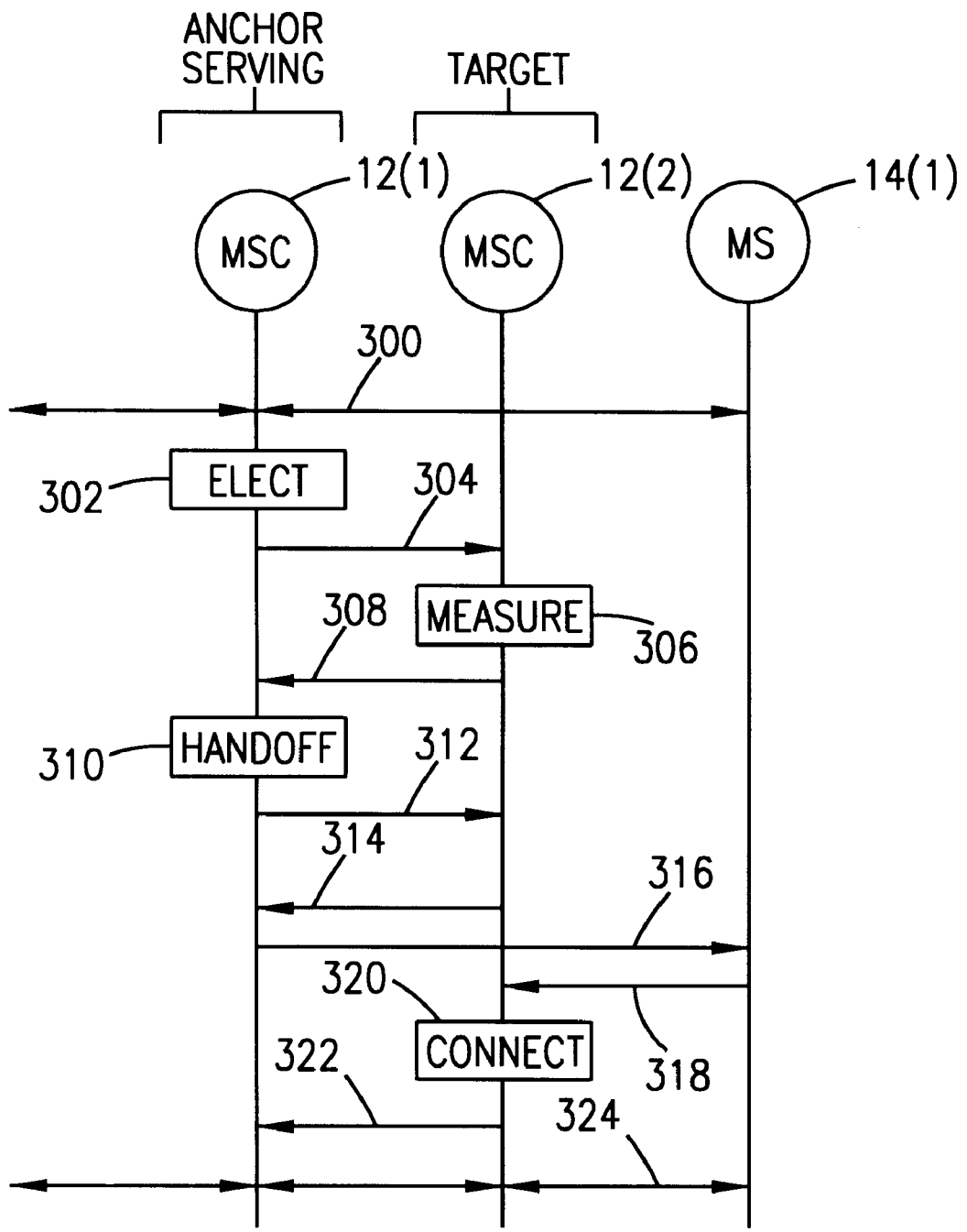
FIGS. 4A–4J are signal flow and node operation diagrams for the cellular telephone network of FIG. 1 illustrating the flow of signals in connection with a present invention handling of plural call handoff processes for a cellular telephone having an international mobile station identity (IMSI) number.

With specific reference now to FIG. 4A, there is shown a signal flow and node operation diagram illustrating the flow of signals in connection with a present invention handling of call handoff forward process for a cellular telephone having an international mobile station identity (IMSI) number. A call 300 is in progress. The serving switching node 12(1) then elects (step 302), based on processing of its internal algorithm, to determine if a handoff to adjacent target switching node 12(2) is appropriate. A handoff measurement request message 304 is then sent to the target switching node 12(2). The target switching node 12(2) then performs locating measurements (step 306), and returns the results 308 to the serving switching node 12(1). A decision is then made in step 310 to handoff the call to the target switching node 12(2). A facilities directive message 312, including at least one of the MIN and/or the IMSI for the mobile station 14(1), as well as the inter-switch circuit identification (if needed), is then sent to the target switching node 12(2) requesting a handoff forward. Assuming that a voice channel is available, the target switching node 12(2) confirms 314 handoff forward. The serving switching node 12(1) then sends a mobile handoff order 316 to the mobile station 14(1). The mobile station 14(1) accesses the identified voice channel (step 318), and the target switching node 12(2) completes the voice path between the voice channel and the trunk connection (step 320). A mobile station on channel message 322 is sent by the target switching node 12(2) to the serving switching node 12(1), and the handoff forward process is completed (call 324) by through connecting the call over the trunk connection.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4B:
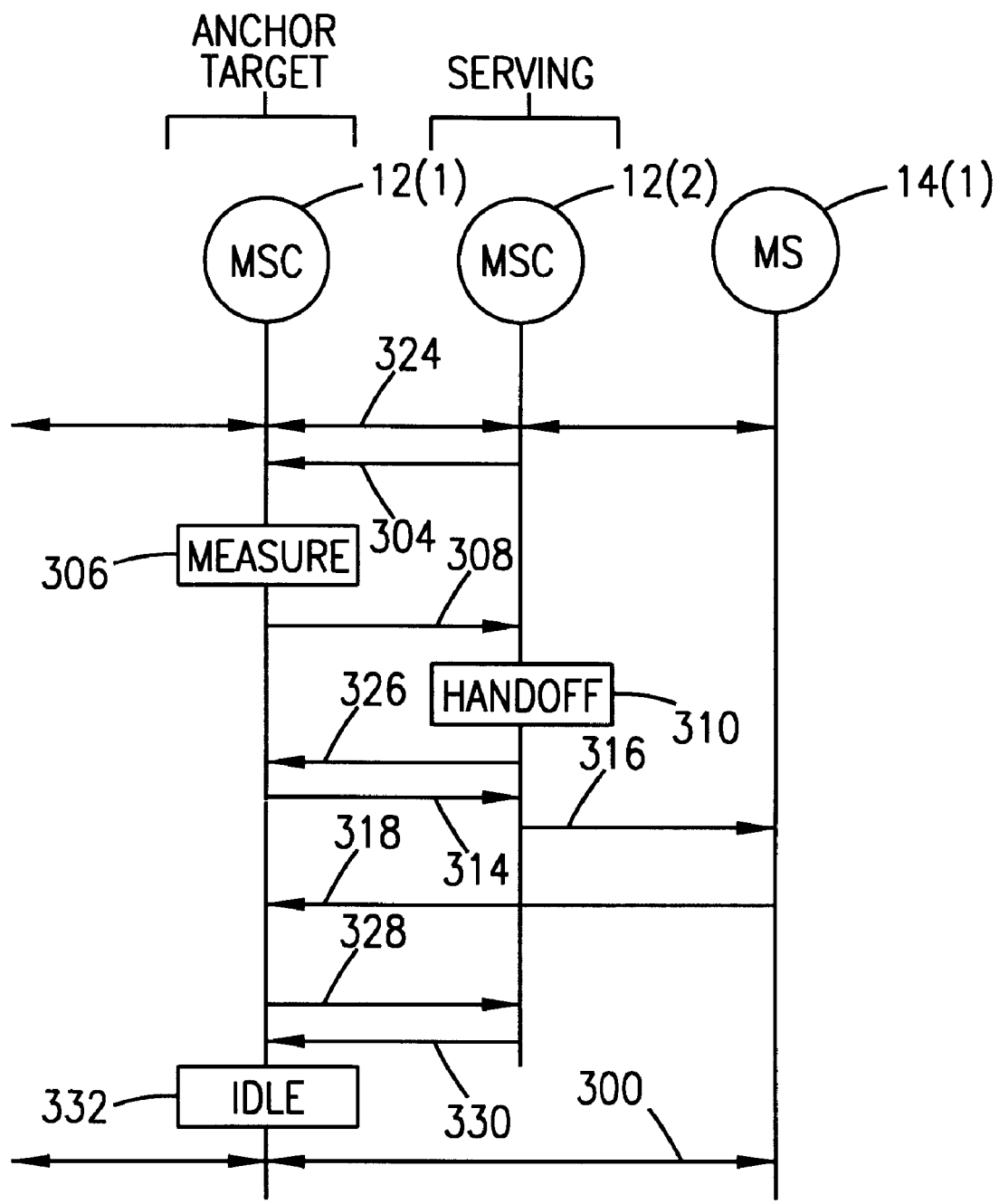

Referring now to FIG. 4B, there is shown a signal flow and node operation diagram illustrating the flow of signals in connection with a present invention handling of call handoff back process for a cellular telephone having an international mobile station identity (IMSI) number. A call 324 is in progress. A handoff measurement request message 304 is sent to the target switching node 12(1) The target switching node 12(1) then performs locating measurements (step 306), and returns the results 308 to the serving switching node 12(2). A decision is then made in step 310 to handoff the call to the target switching node 12(1). A hand back message 326, including at least one of the MIN and/or the IMSI for the mobile station 14(1), as well as the inter-switch circuit identification (if needed), is then sent to the target switching node 12(1) requesting a handoff backward. Assuming that a voice channel is available, the target switching node 12(1) confirms 314 handoff backward. The serving switching node 12(2) then sends a mobile handoff order 316 to the mobile station 14(1). The mobile station 14(1) accesses the identified voice channel (step 318), and the target switching node 12(1) sends a facilities release message 328, including at least one of the MIN and/or IMSI for the mobile station 14(1), as well as the inter-switch circuit identification (if needed), to the serving switching node 12(2) indicating successful completion of the handoff backward. A response 330 is then sent back to the target switching node 12(1) and the trunk connection is marked idle (step 332) to complete the handoff backward process to call 300.

The foregoing description of the call handoff process differs from the prior art process in that the system supports mobile station identification using either a mobile identification number or an international mobile station identity number. Accordingly, unambiguous identification of the mobile station may be made by the system during handoff.

Figure 4C:
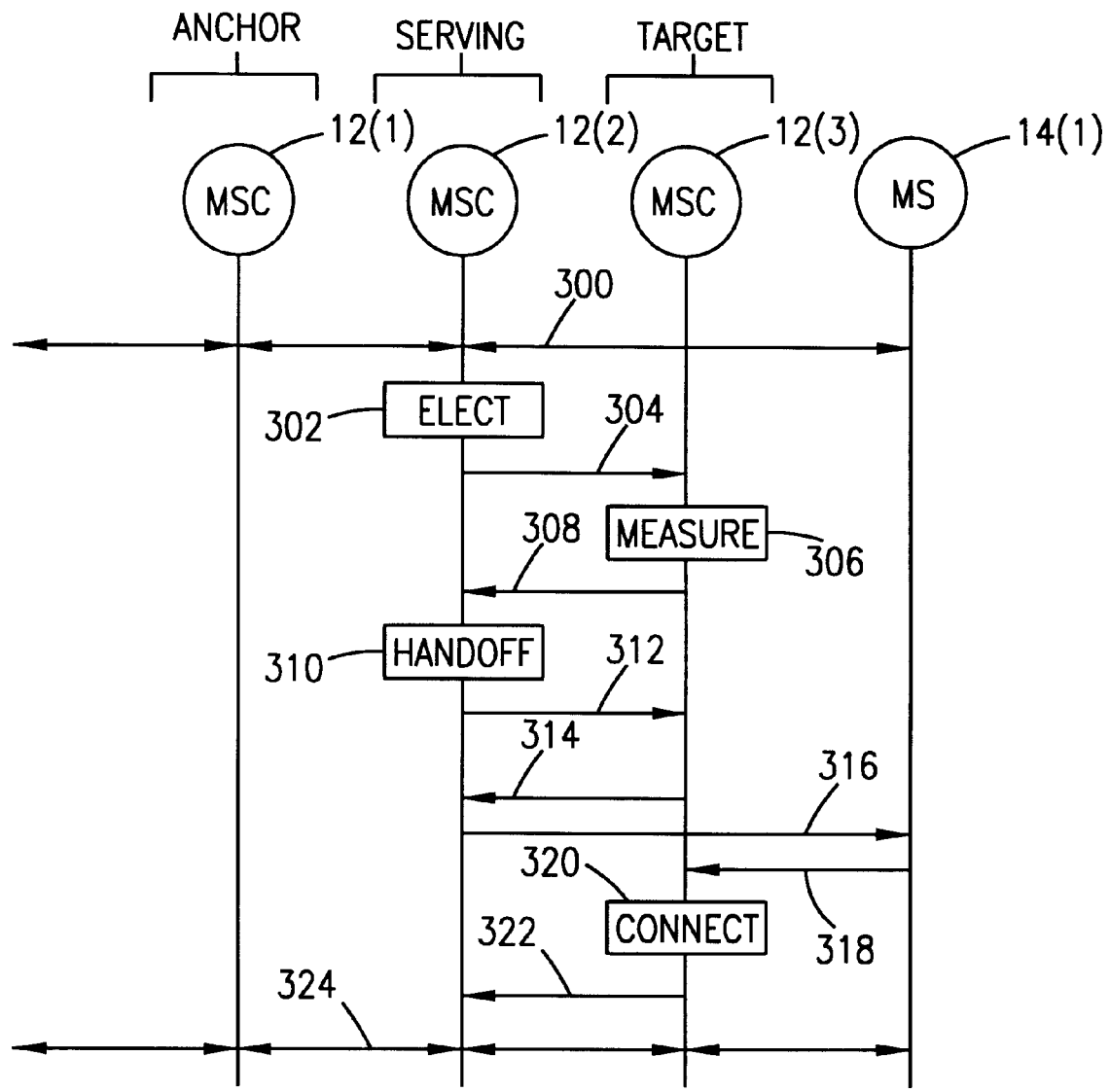

Referring now to FIG. 4C, there is shown a signal flow and node operation diagram illustrating the flow of signals in connection with a present invention handling of call handoff forward with tandem process for a cellular telephone having at least an international mobile station identity (IMSI) number (and perhaps a mobile identification number (MIN)). A call 300 anchored with switching node 12(1) is in progress. The currently serving switching node 12(2) then elects (step 302), based on processing of its internal algorithm, to determine if a handoff is appropriate. A handoff measurement request message 304 is then sent to the target switching node(s) 12(3). The target switching node(s) 12(3) then perform locating measurements (step 306), and returns the results 308 to the serving switching node 12(2). A decision is then made in step 310 to handoff the call to the target switching node 12(3). A facilities directive message 312, including at least one of the MIN and/or the IMSI for the mobile station 14(1), as well as the inter-switch circuit identification (if needed), is then sent to the target switching node 12(3) requesting a handoff forward. Assuming that a voice channel is available, the target switching node 12(3) confirms 314 handoff forward. The serving switching node 12(2) then sends a mobile handoff order 316 to the mobile station 14(1). The mobile station 14(1) accesses the identified voice channel (step 318), and the target switching node 12(3) completes the voice path between the voice channel and the trunk connection (step 320). A mobile station on channel message 322 is sent by the target switching node 12(3) to the serving switching node 12(2), and the handoff forward process is completed (call 324) by through connecting the call over the trunk connection.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4D:
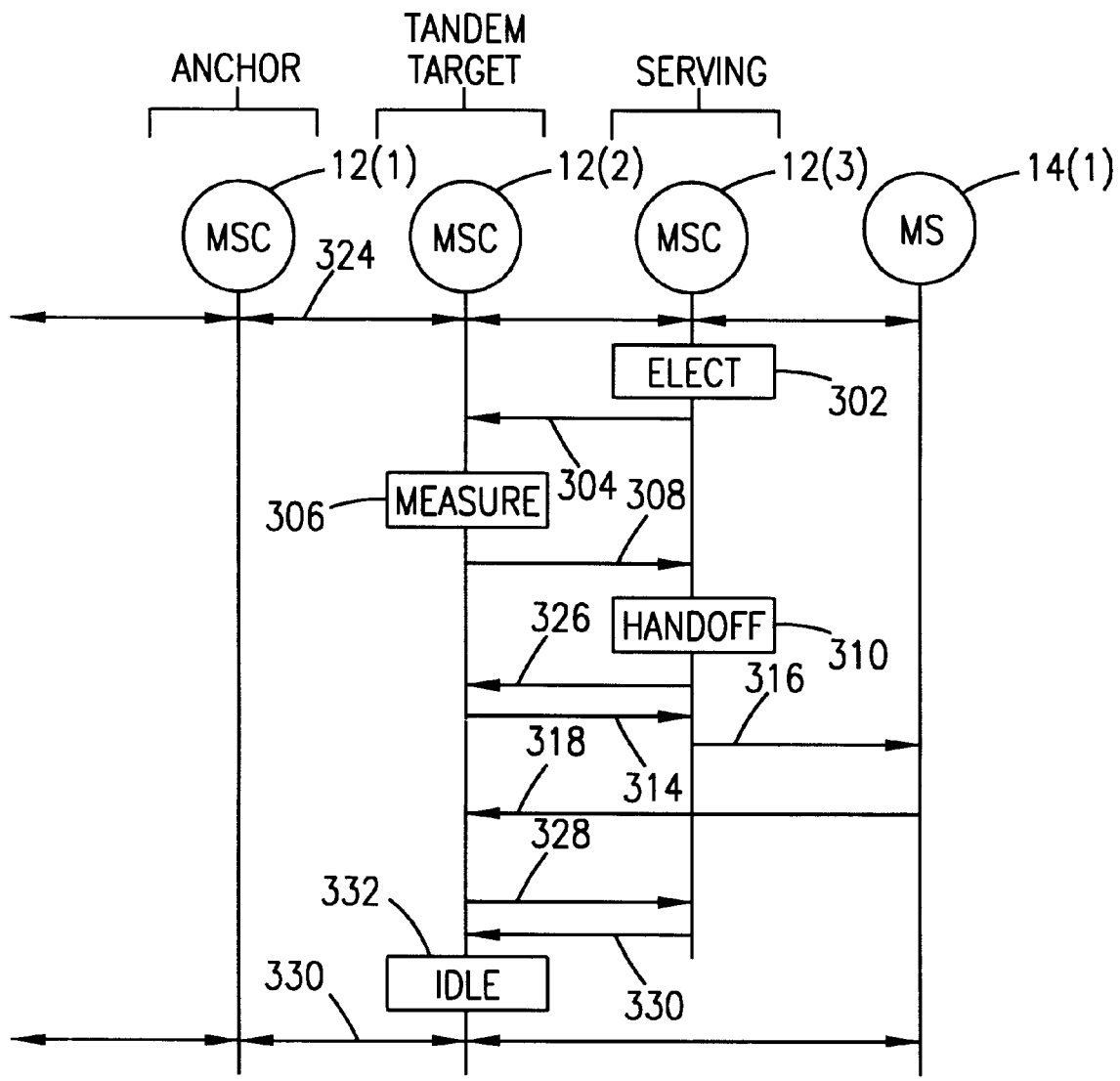

Referring now to FIG. 4D, there is shown a signal flow and node operation diagram illustrating the flow of signals in connection with a present invention handling of call handoff back with tandem process for a cellular telephone having at least an international mobile station identity (IMSI) number (and perhaps a mobile identification number (MIN)). A call 324 anchored with switching node 12(1) is in progress. The currently serving switching node 12(3) then elects (step 302), based on processing of its internal algorithm, to determine if a handoff to previously serving, adjacent target tandem switching node 12(2) is appropriate. A handoff measurement request message 304 is then sent to the target switching node 12(2). The target switching node 12(2) then performs locating measurements (step 306), and returns the results 308 to the serving switching node 12(3). A decision is then made in step 310 to handoff the call to the target switching node 12(2). A hand back message 326, including optionally the MIN and/or IMSI for the mobile station 14(1), as well as the inter-switch circuit identification (if needed), is then sent to the target switching node 12(2) requesting a handoff backward. Assuming that a voice channel is available, the target switching node 12(2) confirms 314 handoff backward. The serving switching node 12(3) then sends a mobile handoff order 316 to the mobile station 14(1). The mobile station 14(1) accesses the identified voice channel (step 318), and the target switching node 12(2) sends a facilities release message 328, including at least one of the MIN and/or the IMSI for the mobile station 14(1), as well as the inter-switch circuit identification (if needed), to the serving switching node 12(3) indicating successful completion of the handoff backward. A response 330 is then sent back to the target switching node 12(2) and the trunk connection marked idle (step 332) to complete the handoff backward process to call 300.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4E:
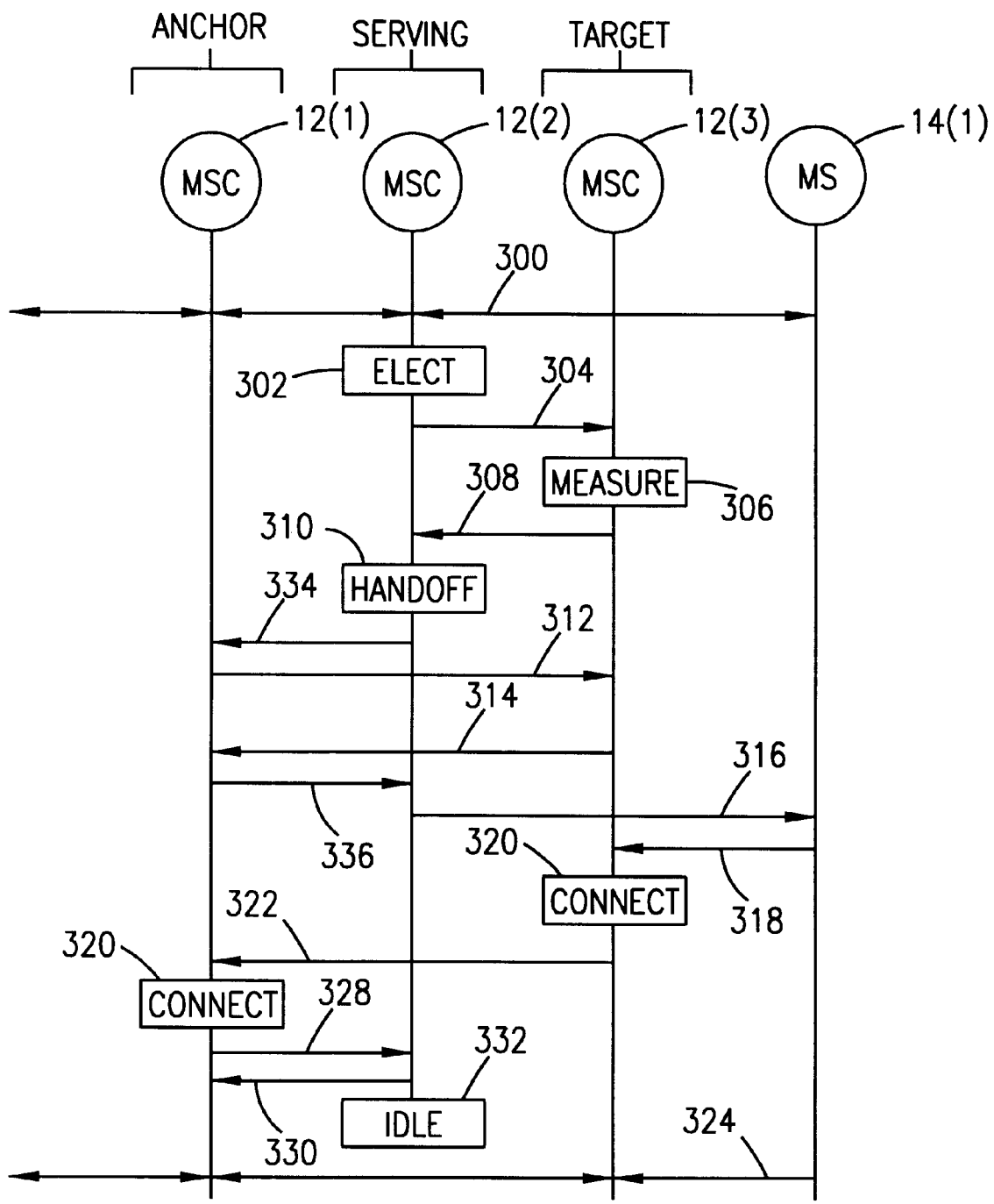

Referring now to FIG. 4E, there is shown a signal flow and node operation diagram illustrating the flow of signals in connection with a present invention handling of call handoff to third with path minimization process for a cellular telephone having at least an international mobile station identity (IMSI) number (and perhaps a mobile identification number (MIN)). A call 300 anchored with switching node 12(1) is in progress. The currently serving switching node 12(2) then elects (step 302), based on processing of its internal algorithm, to determine if a handoff is appropriate. A handoff measurement request message 304 is then sent to the target switching node 12(3). The target switching node 12(3) then performs locating measurements (step 306), and returns the results 308 to the serving switching node 12(2). A decision is then made in step 310 to handoff the call to the target switching node 12(3), and an identification is made that path minimization may be possible. A handoff to third message 334, including at least one of the MIN and/or the IMSI for the mobile station 14(1), as well as the inter-switch circuit identification (if needed) and target switching node 12(3), is then sent by the serving switching node 12(2) to the anchor switching node 12(1) requesting handoff with path minimization. A facilities directive message 312, including at least one of the MIN and/or the IMSI for the mobile station 14(1), as well as the inter-switch circuit identification (if needed), is then sent to the target switching node 12(3) requesting the handoff. Assuming that a voice channel is available, the target switching node 12(3) confirms 314 the handoff. The anchor switching node 12(1) then replies 336 to the serving switching node 12(2) with the parameters for the selected voice channel. The serving switching node 12(2) then sends a mobile handoff order 316 to the mobile station 14(1). The mobile station 14(1) accesses the identified voice channel (step 318), and the target switching node 12(3) completes the voice path between the voice channel and the trunk connection (step 320). A mobile station on channel message 322 is sent by the target switching node 12(3) to the anchor switching node 12(1), and the handoff forward process is completed (step 320) by through connecting the call over the trunk connection. A facilities release message 328, including optionally the MIN and/or IMSI for the mobile station 14(1), as well as the inter-switch circuit identification (if needed), is then sent by the anchor switching node 12(1) to the serving switching node 12(2) indicating successful completion of the handoff to third. A response 330 is then sent back to the anchor switching node 12(1) and the trunk connection marked idle (step 332) to complete the handoff process to call 324.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4F:
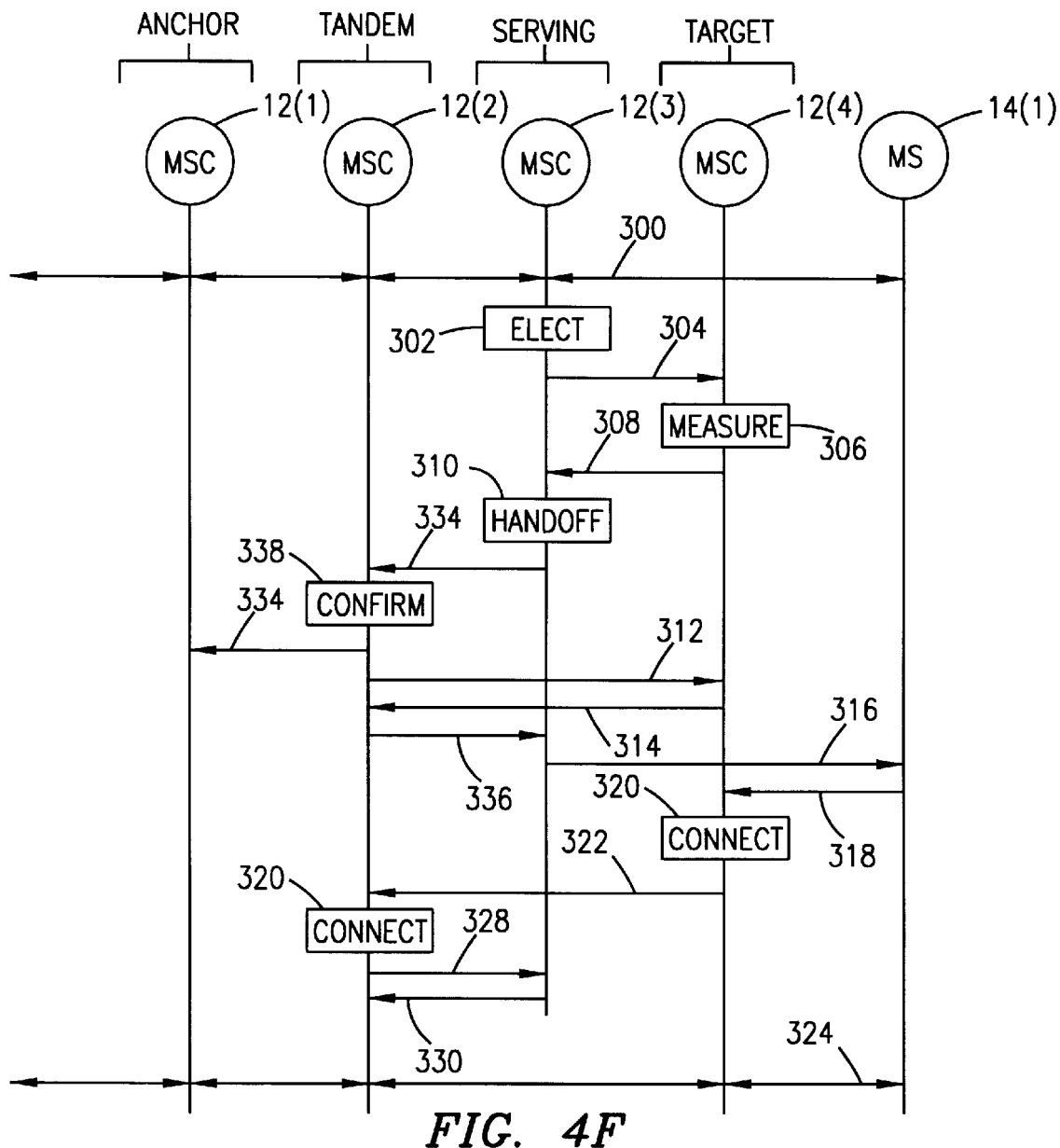

Referring now to FIG. 4F, there is shown a signal flow and node operation diagram illustrating the flow of signals in connection with a present invention handling of call handoff to third with tandem and path minimization process for a cellular telephone having at least an international mobile station identity (IMSI) number (and perhaps a mobile identification number (MIN)). A call 300 anchored with switching node 12(1) is in progress. The currently serving switching node 12(3) then elects (step 302), based on processing of its internal algorithm, to determine if a handoff is appropriate. A handoff measurement request message 304 is then sent to the target switching node 12(4). The target switching node 12(4) then performs locating measurements (step 306), and returns the results 308 to the serving switching node 12(3). A decision is then made in step 310 to handoff the call to the target switching node 12(4), and an identification is made that path minimization may be possible. A handoff to third message 334, including optionally the MIN and/or the IMSI for the mobile station 14(1), as well as the inter-switch circuit identification (if needed), is then sent by the serving switching node 12(3) to a previously serving tandem switching node 12(2) requesting handoff with path minimization. The tandem switching node 12(2) confirms in step 338 that a tandem depth limitation has not been exceeded, and forwards the handoff to third message 334 to the anchor switching node 12(1). Assuming now that the target switching node 12(4) is known to the tandem switching node 12(2), and that a trunk connection is available, a facilities directive message 312, including the MIN and/or IMSI for the mobile station 14(1), as well as the inter-switch circuit identification (if needed), is then sent to the target switching node 12(4) requesting the handoff. Assuming that a voice channel is available, the target switching node 12(4) confirms 314 the handoff to the tandem switching node 12(2). The tandem switching node 12(2) then replies 336 to the serving switching node 12(3) with the parameters for the selected voice channel. The serving switching node 12(3) then sends a mobile handoff order 316 to the mobile station 14(1). The mobile station 14(1) accesses the identified voice channel (step 318), and the target switching node 12(4) completes the voice path between the voice channel and the trunk connection (step 320). A mobile station on channel message 322 is sent by the target switching node 12(4) to the tandem switching node 12(2), and the handoff forward process is completed (step 320) by through connecting the call over the trunk connection. A facilities release message 328, including optionally the MIN and/or IMSI for the mobile station 14(1), as well as the inter-switch circuit identification (if needed), is then sent by the tandem switching node 12(2) to the serving switching node 12(3) indicating successful completion of the handoff to third. A response 330 is then sent back to the tandem switching node 12(2) and the trunk connection is marked idle (step 332) to complete the handoff process to call 324.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4G:
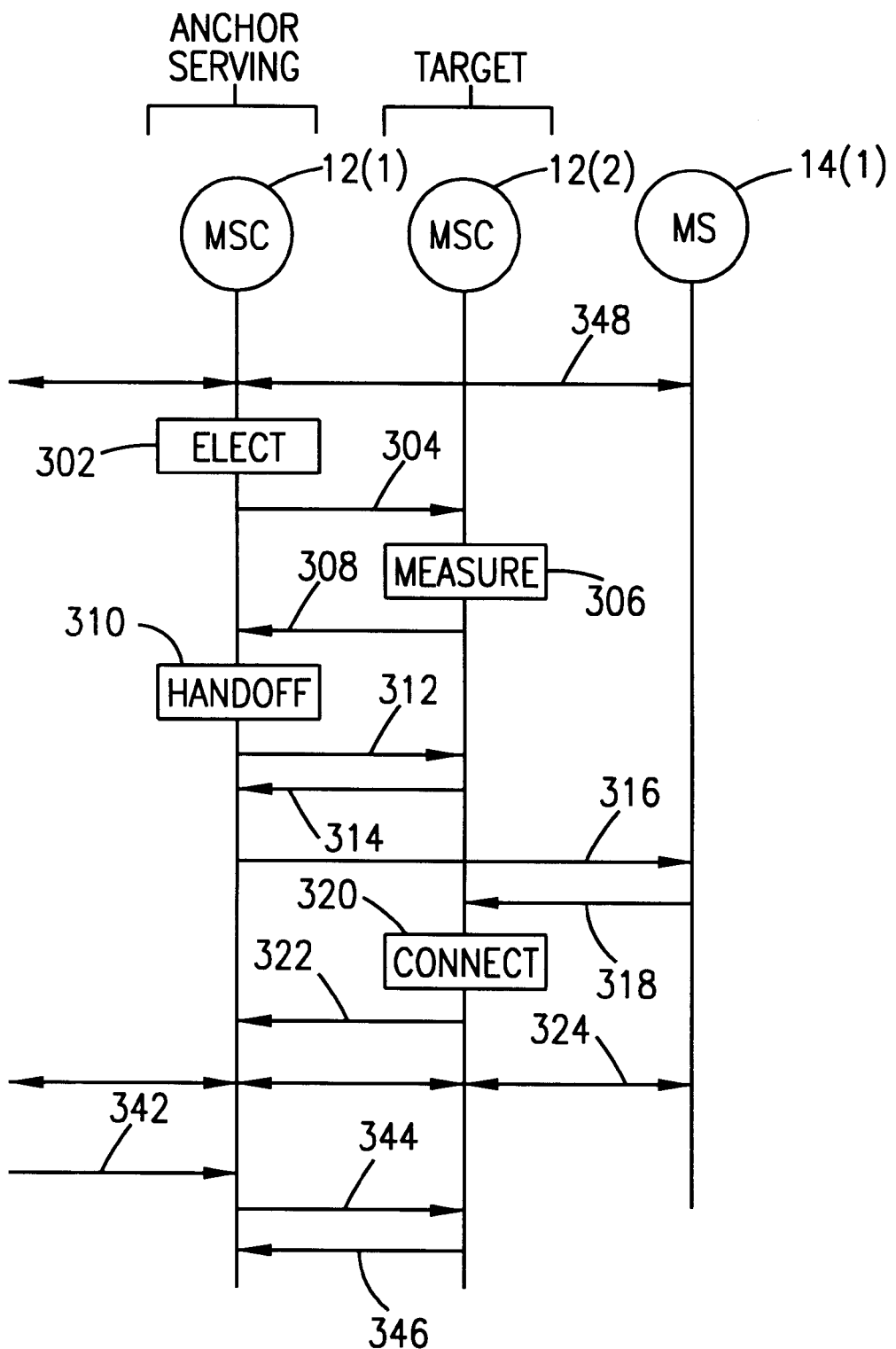

Referring now to FIG. 4G, there is shown a signal flow and node operation diagram illustrating the flow of signals in connection with a present invention handling of a handoff of an originating mobile station call awaiting answer process for a cellular telephone having at least an international mobile station identity (IMSI) number (and perhaps a mobile identification number (MIN)). A call 340 is originated by a mobile station 14(1), but has not yet been answered by the called party. The serving switching node 12(1) then elects (step 302), based on processing of its internal algorithm, that a handoff is appropriate. A handoff measurement request message 304 is then sent to the target switching node 12(2). The target switching node 12(2) then performs locating measurements (step 306), and returns the results 308 to the serving switching node 12(1). A decision is then made in step 310 to handoff the call to the target switching node 12(2). A facilities directive message 312, including at least one of the MIN and/or the IMSI for the mobile station 14(1), as well as the inter-switch circuit identification (if needed), is then sent to the target switching node 12(2) requesting a handoff forward. Assuming that a voice channel is available, the target switching node 12(2) confirms 314 the handoff forward. The serving switching node 12(1) then sends a mobile handoff order 316 to the mobile station 14(1). The mobile station 14(1) accesses the identified voice channel (step 318), and the target switching node 12(2) completes the voice path between the voice channel and the trunk connection (step 320). A mobile station on channel message 322 is sent by the target switching node 12(2) to the serving switching node 12(1), and the handoff forward process is completed (call 324) by through connecting the call over the trunk connection. The called party then answers the call (step 342). The prior serving (now anchor) switching node 12(1) then signals 344 the prior target (now serving) switching node 12(2) as to the answering of the call, and receives a response 346.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4H:
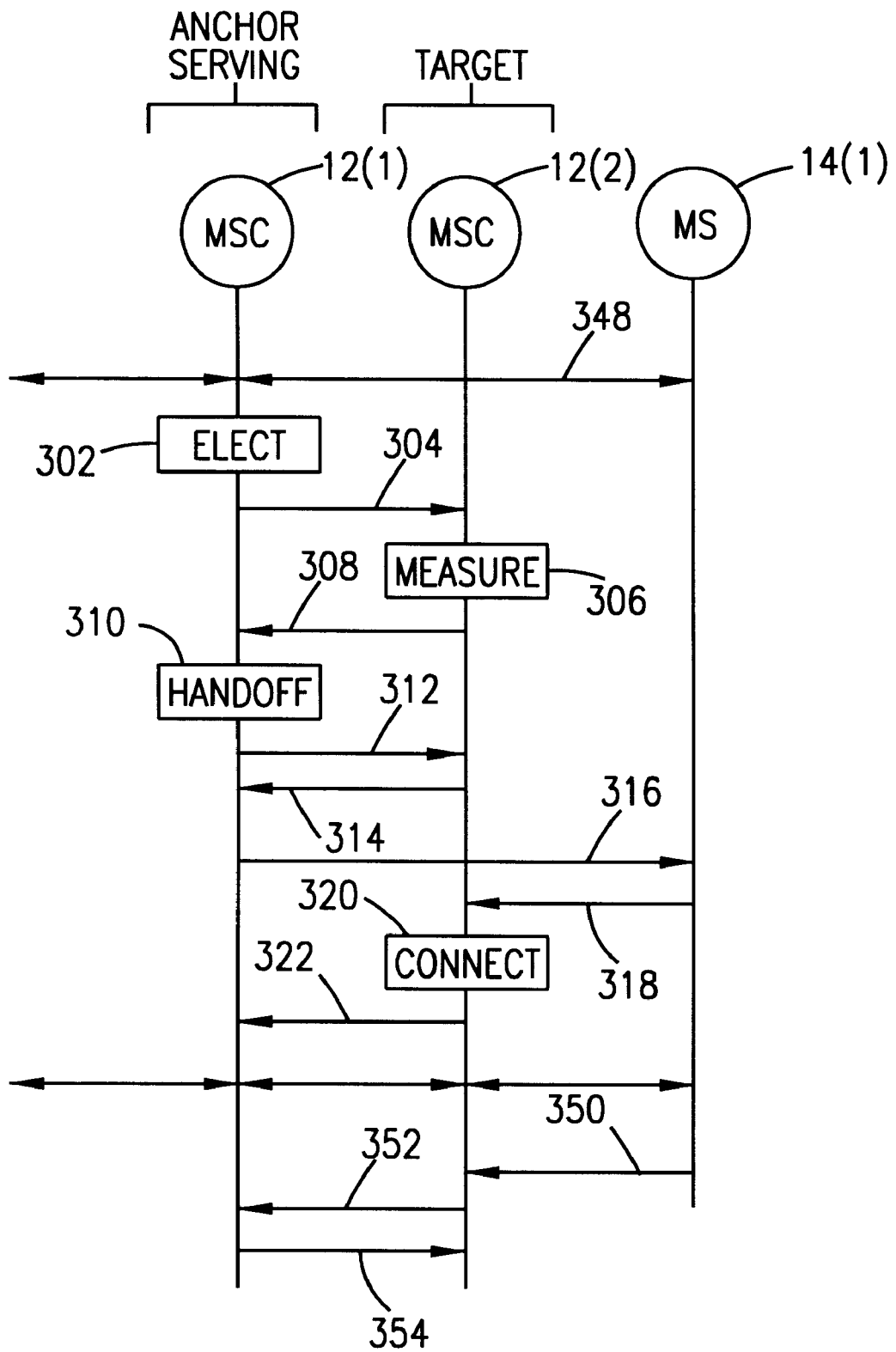

Referring now to FIG. 4H, there is shown a signal flow and node operation diagram illustrating the flow of signals in connection with a present invention handling of a handoff of a terminating mobile station call while alerting process for a cellular telephone having at least an international mobile station identity (IMSI) number (and perhaps a mobile identification number (MIN)). A call 348 is terminated to a mobile station 14(1), but has not yet been answered by the subscriber. The serving switching node 12(1) then elects (step 302), based on processing of its internal algorithm, that a handoff is appropriate. A handoff measurement request message 304 is then sent to the target switching node 12(2). The target switching node 12(2) then performs locating measurements (step 306), and returns the results 308 to the serving switching node 12(1). A decision is then made in step 310 to handoff the call to the target switching node 12(2). A facilities directive message 312, including at least one of the MIN and/or the IMSI for the mobile station 14(1), as well as the inter-switch circuit identification (if needed), is then sent to the target switching node 12(2) requesting a handoff forward. Assuming that a voice channel is available, the target switching node 12(2) confirms 314 the handoff forward. The serving switching node 12(1) then sends a mobile handoff order 316 to the mobile station 14(1). The mobile station 14(1) accesses the identified voice channel (step 318), and the target switching node 12(2) completes the voice path between the voice channel and the trunk connection (step 320). A mobile station on channel message 322 is sent by the target switching node 12(2) to the serving switching node 12(1), and the handoff forward process is completed (call 324) by through connecting the call over the trunk connection. The subscriber then answers the call (step 350). The prior target (now serving) switching node 12(2) then signals 352 the prior serving (now anchor) switching node 12(1) as to the answering of the call, and receives a response 354.

The foregoing description of the call handoff process differs from the prior art process in that the system supports mobile station identification using either a mobile identification number or an international mobile station identity number. Accordingly, unambiguous identification of the mobile station may made by the system during handoff.

Figure 4I:
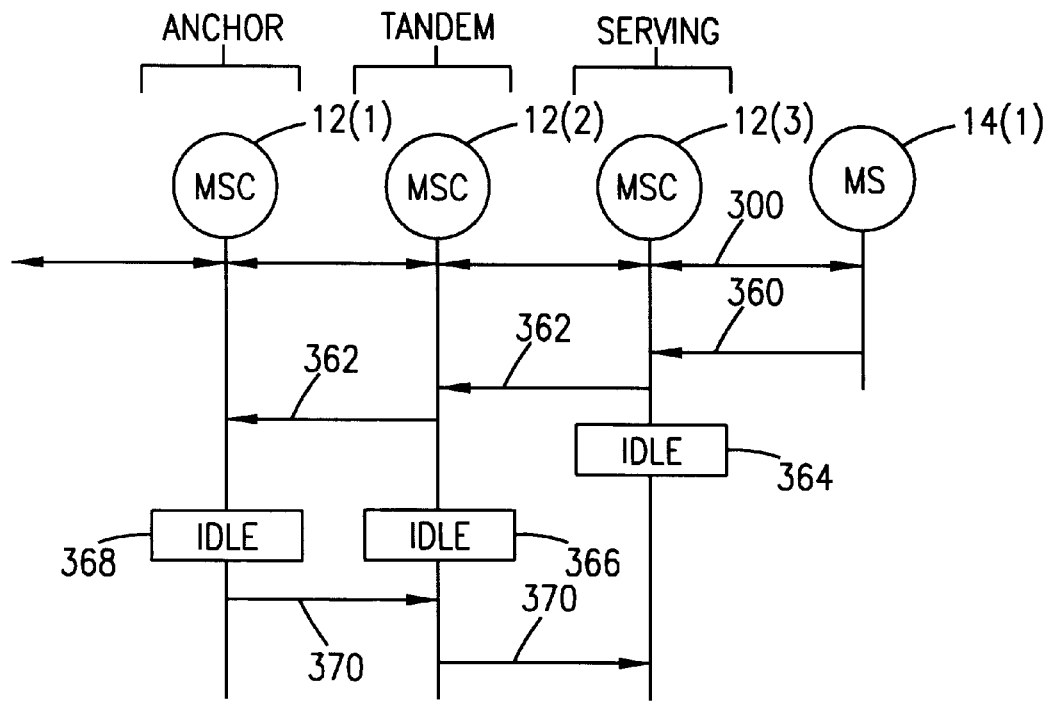

Referring now to FIG. 4I, there is shown a signal flow and node operation diagram illustrating the flow of signals in connection with a present invention handling of mobile station call release after handoff process for a cellular telephone having at least an international mobile station identity (IMSI) number (and perhaps a mobile identification number (MIN)). A call 300 anchored in switching node 12(1) is in progress. The mobile station 14(1) then releases 360 the call. The serving switching node 12(3) recognizes that an inter-switch trunk connection was used for the call, and sends a facilities release message 362 to the tandem switching node 12(2). This message is then forwarded on to the anchor switching node 12(1) with the optional international mobile station identity. The trunk connection is then marked idle by the anchor switching node 12(1) in step 364, the tandem switching node 12(2) in step 366, and the serving switching node 12(1) in step 368, with the transmission and processing of a corresponding response message 370.

Figure 4J:
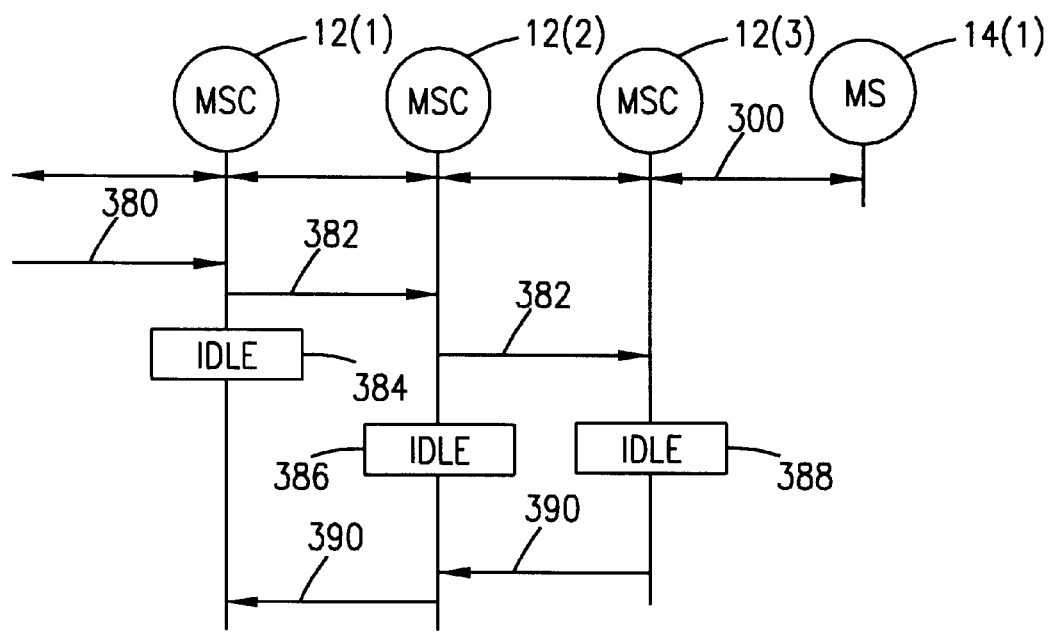

Referring now to FIG. 4J, there is shown a signal flow and node operation diagram illustrating the flow of signals in connection with a present invention handling of calling party call release after handoff process for a cellular telephone having at least an international mobile station identity (IMSI) number (and perhaps a mobile identification number (MIN)). A call 300 anchored in switching node 12(1) is in progress. A call release signal 380 is then received by the anchor switching node 12(1) optionally including the international mobile station identity. The anchor switching node 12(1) recognizes that an inter-switch trunk connection was used for the call, and sends a facilities release message 382 to the tandem switching node 12(2). This message is then forwarded on to the serving switching node 12(3). The trunk connection is then marked idle by the serving switching node 12(3) in step 384, the tandem switching node 12(2) in step 386, and the anchor switching node 12(1) in step 388, with the transmission and processing of a corresponding response message 390.

Reference is now made in combination to FIGS. 1 and 5A–5G. FIGS. 5A–5G wherein there are shown signal flow and node operation diagrams for the cellular telephone network of FIG. 1 illustrating the flow of signals in connection with a present invention handling of other network transactions with respect to a cellular telephone having an international mobile station identity (IMSI) number.

Figure 5A:
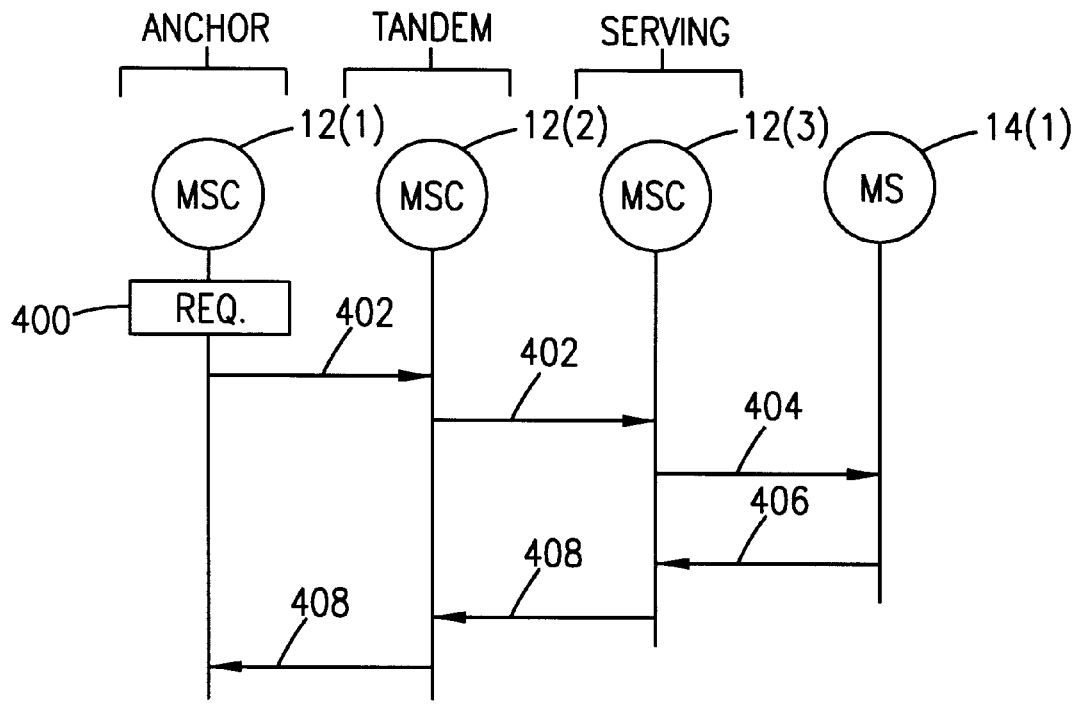
FIGS. 5A–5G are signal flow and node operation diagrams for the cellular telephone network of FIG. 1 illustrating the flow of signals in connection with a present invention handling of other network transactions with respect to a cellular telephone having an international mobile station identity (IMSI) number.

Referring now to FIG. 5A, following an intersystem handoff, an anchor mobile switching center 12(1) receives a request (action 400) to perform a unique challenge to the mobile station 14(1). The anchor mobile switching center 12(1) then sends an authentication directive forward message 402, including a mobile station identification such as at least one of the MIN or the IMSI for the mobile station 14(1), to the serving mobile switching center 12(3) (via any tandem mobile switching center 12(2), if needed) requesting that the mobile station initiate an authentication with the system. At the serving mobile switching center 12(3) then issues a unique challenge order 404 to the mobile station 14(1). Responsive thereto, the mobile station 14(1) signals 406 the serving mobile switching center 12(3). A report 408 of the outcome of the unique challenge order is then sent back to the anchor mobile switching center 12(1) (via any tandem mobile switching center 12(2), if needed).

Figure 5B:
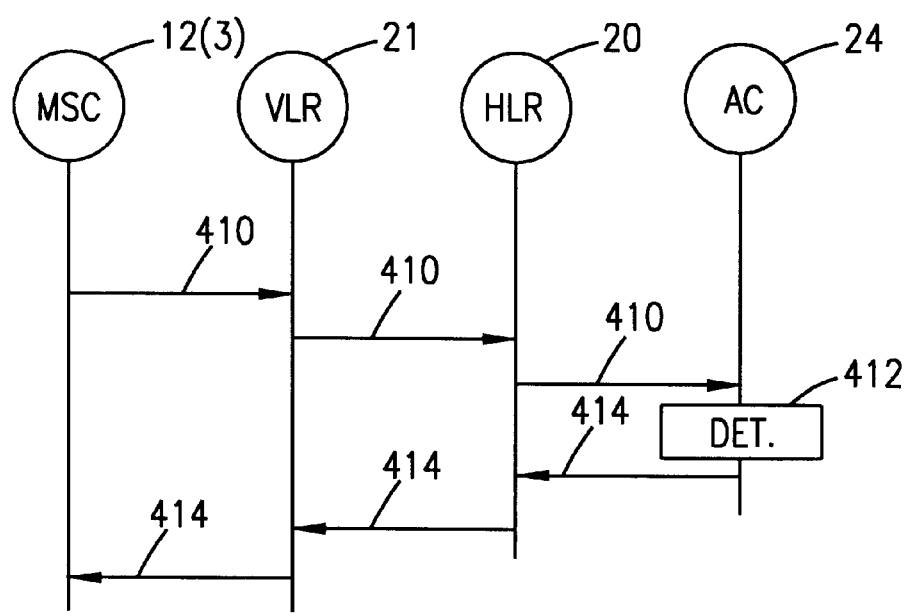

Referring now to FIG. 5B, in instances where authentication of a mobile station 14(1) fails (due perhaps to RANDC mismatch upon initial registration), the serving mobile switching center 12(3) transmits an authentication failure report message 410, including either the MIN or the IMSI depending on how the mobile station 14(1) last registered, to the visitor location register 21. This message 410 is forwarded on to the authentication center 24 via the home location register 20. From the message 410, the authentication center 24 determines (action 412) that the mobile station 14(1) should be denied access to the system. Accordingly, an authentication failure return result message 414, including a deny access parameter, is sent back to the serving mobile switching center 12(3) via the home location register 20 and the visitor location register 21.

Figure 5C:
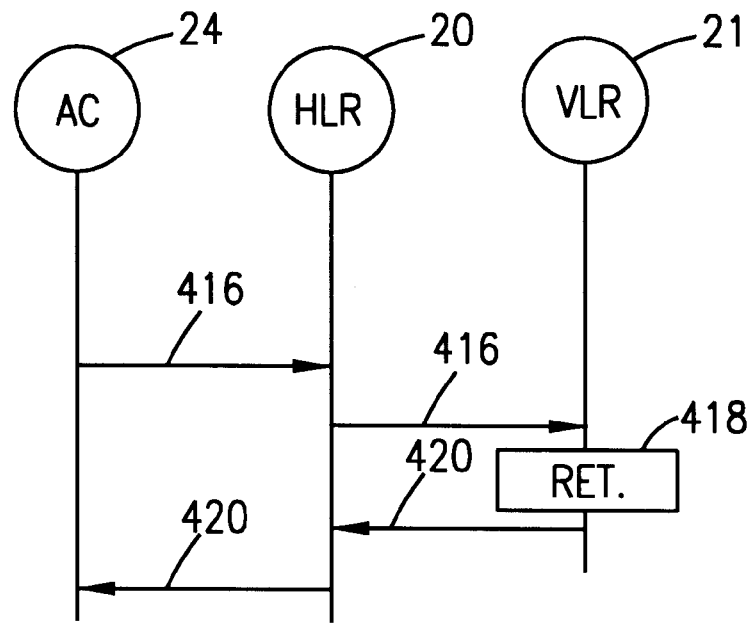

Referring now to FIG. 5C, when the authentication center 24 want to know the current value of the call history count (COUNT) parameter, a count request message 416, including either the MIN or the IMSI depending on how the mobile station 14(1) last registered, is sent to the visitor location register 21 via the home location register 20. The count is then retrieved (action 418), and the value returned as a parameter within a return result message 420 sent from the visitor location register 21 to the authentication center 24 via the home location register 20.

Figure 5D:
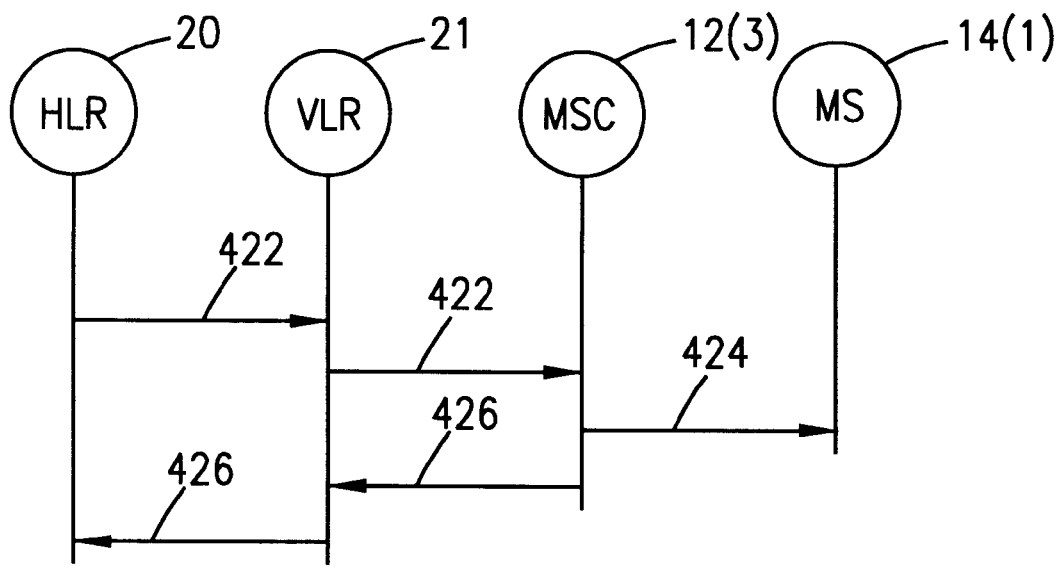

Referring now to FIG. 5D, instance arise where the home location register 20 wants to provide a special notification to an idle mobile station 14(1). In such cases, the home location register 20 transmits an information directive message 422, including either the MIN or the IMSI depending on how the mobile station 14(1) last registered, to the serving mobile switching center 12(3) via the visitor location register 21. The serving mobile switching center 12(3) then notifies the mobile station 14(1) with an appropriate alert 424. A return result message 426 is then sent by the serving mobile switching center 12(3) to the home location register 20 via the visitor location register 21 containing an indication of the result of the notification.

Figure 5E:
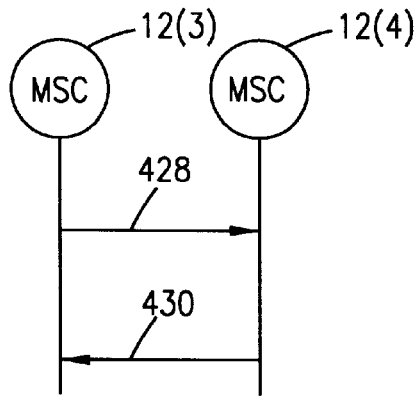

Referring now to FIG. 5E, instances arise where a serving mobile switching center 12(3) needs to request a border mobile switching center 12(4) to either page a mobile station 14(1) or listen for a page response from a mobile station (analogous to the IS-41 ISPAGE and ISPAGE2 messages). The serving mobile switching center 12(3) accordingly generates an intersystem page message 428, including all parameters known about the mobile station 14(1) including, if available, both the MIN and IMSI, for transmission to the border mobile switching center 12(4). An appropriate return result message 430 is then sent back to the serving mobile switching center 12(3) from the border mobile switching center 12(4). The intersystem page message is typically used in two situations: first, to request the return of routing information; and second, to confirm mobile station presence.

Figure 5F:
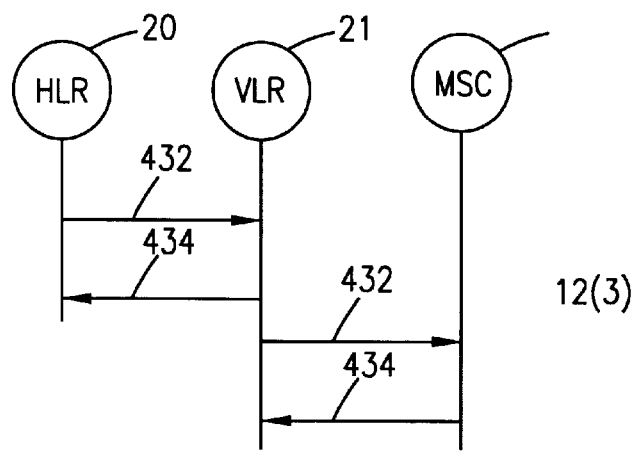

Referring now to FIG. 5F, it is sometimes necessary to re-confirm mobile station 14(1) authorization without updating the subscriber profile. A qualification directive message 432, including all parameters known about the mobile station 14(1) including, if available, both the MIN and IMSI, is generated by the home location register 20 for transmission to the visitor location register 21. Responsive thereto, the visitor location register 21 transmits an appropriate return result message 434 back to the home location register 20. Similarly, the qualification directive message 432, including either the MIN or the IMSI depending on how the mobile station 14(1) last registered, may instead be generated by the visitor location register 21 for transmission to the serving mobile switching center 12(3). Again, an appropriate return result message 434 is transmitted back to the visitor location register 21. It is further noted that in some instances it would be advantageous to include both the MIN and IMSI within the qualification directive message 432. For example, such could be used to inform the serving mobile switching center 12(3) of all the various mobile station identifications used to identify the mobile station 14(1).

Figure 5G:
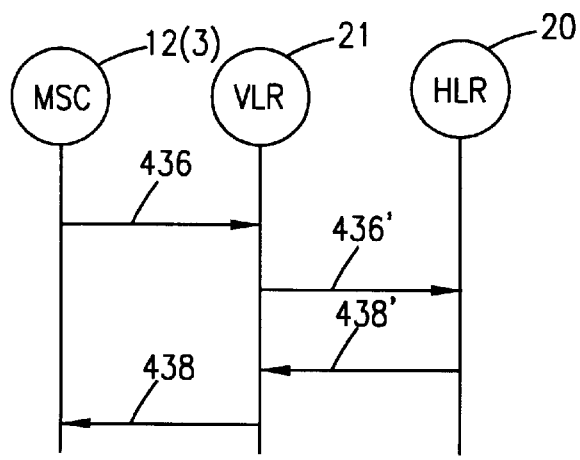

Referring now to FIG. 5G, instances arise where a serving mobile switching center needs to validate a mobile station 14(1) and perhaps obtain its subscriber profile. A qualification request message 436, including all parameters known about the mobile station 14(1) including, if available, both the MIN and IMSI, is accordingly generated by the serving mobile switching center 12(3) after detecting mobile station presence, and is sent to the visitor location register 21. If the mobile station 14(1) had previously registered and its profile is stored in the visitor location register, no further action except to respond 438 appropriately to the serving mobile switching center 12(3) is needed. If no such registration had previously occurred, and the mobile station 14(1) is unknown to the visitor location register 21, a qualification request message 436', including either the MIN or the IMSI depending on how the mobile station 14(1) last registered, is accordingly generated by the visitor location register 21 and is sent to the home location register 20. The home location register 20 then responds 438' to the visitor location register 21 with the service profile, and an appropriate response 438 is sent to the serving mobile switching center 12(3).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for cellular telephone network operation comprising the steps of:
   receiving by the network from a mobile station an identification of that mobile station comprising an international mobile station identity (IMSI) number; and
   sending of the mobile station sent international mobile station identity number received by the network during inter-nodal network level transactions to provide for unambiguous identification of the mobile station associated therewith in connection with the handling of such network level transactions.

2. The method as in claim 1 wherein the step of utilizing comprises the step of deriving a mobile identification number (MIN) for the mobile station from the received international mobile station identity number associated with that mobile station, the step of deriving further comprising the step of using the received international mobile station identity number to lookup a corresponding MIN from a data base record linking international mobile station identity numbers to MINs.

3. The method as in claim 2 wherein the step of utilizing further comprises the step of utilizing the derived mobile identification number in providing network operation functions such as call delivery, registration, authentication and handoff.

4. The method as in claim 1 wherein the step of utilizing comprises the step of identifying the mobile station by its associated international mobile station identity number during registration of the mobile station with the network, the step of identifying comprising the step of using the international mobile station identity with any inter-nodal network level transactions which occur in connection with the registration.

5. The method as in claim 1 wherein the step of utilizing comprises the step of identifying the mobile station by its associated international mobile station identity number during authentication of the mobile station with the network, the step of identifying comprising the step of using the international mobile station identity with any inter-nodal network level transactions which occur in connection with the authentication.

6. The method as in claim 1 wherein the step of utilizing comprises the step of identifying the mobile station by its associated international mobile station identity number during handoff by the network of a voice or data call communication with the mobile station, the step of identifying comprising the step of using the international mobile station identity with any inter-nodal network level transactions which occur in connection with the handoff.

7. The method as in claim 1 wherein the step of utilizing comprises the step of identifying the mobile station by its associated international mobile station identity number during delivery by the network of a voice or data call communication to the mobile station, the step of identifying comprising the step of the using international mobile station identity with any inter-nodal network level transactions which occur in connection with the delivery.

8. The method as in claim 1 wherein the step of utilizing comprises the step of identifying the mobile station by its associated international mobile station identity number during release by the network of a voice or data call communication with the mobile station, the step of identifying comprising the step of using the international mobile station identity with any inter-nodal network level transactions which occur in connection with the release.

9. The method as in claim 1 wherein the step of utilizing comprises the step of identifying the mobile station by its associated international mobile station identity number when requesting that a unique challenge be made by the network to the mobile station, the step of identifying comprising the step of using the international mobile station identity with any inter-nodal network level transactions which occur in connection with requesting the unique challenge.

10. The method as in claim 1 wherein the step of utilizing comprises the step of identifying the mobile station by its associated international mobile station identity number when reporting on a failure to authenticate the mobile station, the step of identifying comprising the step of using the international mobile station identity with any inter-nodal network level transactions which occur in connection with reporting the failure.

11. The method as in claim 1 wherein the step of utilizing comprises the step of identifying the mobile station by its associated international mobile station identity number when requesting a call history count relating to the mobile station, the step of identifying comprising the step of using the international mobile station identity with any inter-nodal network level transactions which occur in connection with requesting the call history count.

12. The method as in claim 1 wherein the step of utilizing comprises the step of identifying the mobile station by its associated international mobile station identity number when directing the network to provide a special notification to the mobile station, the step of identifying comprising the step of using the international mobile station identity with any inter-nodal network level transactions which occur in connection with the special notification.

13. The method as in claim 1 wherein the step of utilizing comprises the step of identifying the mobile station by its associated international mobile station identity number when directing the network to engage in an intersystem paging operation, the step of identifying comprising the step of using the international mobile station identity with any inter-nodal network level transactions which occur in connection with the intersystem paging operation.

14. The method as in claim 1 wherein the step of utilizing comprises the step of identifying the mobile station by its associated international mobile station identity number when re-confirming mobile station authorization, the step of identifying comprising the step of using the international mobile station identity with any inter-nodal network level transactions which occur in connection with re-confirming authorization.

15. The method as in claim 1 wherein the step of utilizing comprises the step of identifying the mobile station by its associated international mobile station identity number when requesting validation of the mobile station, the step of identifying comprising the step of using the international mobile station identity with any inter-nodal network level transactions which occur in connection with requesting validation.

16. A cellular telephone network, comprising:
- a switching node;
- a visitor location register in communication with the switching node;
- a home location register in communication with the visitor location register;
- an authentication center in communication with the home location register;
- means for receiving from a mobile station an identification of that mobile station comprising an international mobile station identity (IMSI) number; and
- means for sending the international mobile station identity number received from the mobile station in connection with network level transactions between the switching node, visitor location center, home location register and authentication center to provide for unambiguous identification of the mobile station during the handling of such network level transactions.

* * * * *